United States Patent
Cohen et al.

(10) Patent No.: US 8,223,155 B2
(45) Date of Patent: Jul. 17, 2012

(54) METHOD FOR SIMULATING LARGE NUMBERS OF SPHERICAL BODIES INTERACTING

(75) Inventors: Jonathan Cohen, Ann Arbor, MI (US); Chris Allen, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 874 days.

(21) Appl. No.: 12/111,069

(22) Filed: Apr. 28, 2008

(65) Prior Publication Data

US 2008/0270092 A1   Oct. 30, 2008

Related U.S. Application Data

(60) Provisional application No. 61/042,411, filed on Apr. 4, 2008, provisional application No. 61/042,404, filed on Apr. 4, 2008, provisional application No. 60/926,594, filed on Apr. 27, 2007, provisional application No. 60/926,506, filed on Apr. 27, 2007, provisional application No. 60/926,501, filed on Apr. 27, 2007.

(51) Int. Cl.
*G06T 13/00* (2011.01)
*G06G 7/48* (2006.01)

(52) U.S. Cl. .............................. 345/474; 345/958; 703/6

(58) Field of Classification Search .................. 345/474, 345/958; 703/2, 6
See application file for complete search history.

(56) References Cited

U.S. PATENT DOCUMENTS

| | | | | |
|---|---|---|---|---|
| 5,515,489 | A * | 5/1996 | Yaeger | 345/473 |
| 5,594,671 | A * | 1/1997 | Chen et al. | 703/6 |
| 6,049,341 | A * | 4/2000 | Mitchell et al. | 345/473 |
| 6,067,096 | A * | 5/2000 | Nagle | 345/473 |
| 6,208,357 | B1 * | 3/2001 | Koga et al. | 345/473 |
| 6,708,142 | B1 * | 3/2004 | Baillot et al. | 703/2 |
| 7,403,202 | B1 * | 7/2008 | Nash | 345/474 |
| 7,796,128 | B2 | 9/2010 | Radzikowski et al. | |
| 2002/0161562 | A1 * | 10/2002 | Strunk et al. | 703/6 |
| 2003/0227455 | A1 | 12/2003 | Lake et al. | |
| 2005/0162433 | A1 * | 7/2005 | Tonge et al. | 345/475 |
| 2005/0165874 | A1 * | 7/2005 | Zhang et al. | 708/446 |
| 2005/0248570 | A1 * | 11/2005 | Stelly, III | 345/423 |
| 2006/0149516 | A1 * | 7/2006 | Bond et al. | 703/6 |
| 2006/0217945 | A1 * | 9/2006 | Leprevost | 703/2 |
| 2006/0235659 | A1 * | 10/2006 | Stam | 703/2 |

(Continued)

OTHER PUBLICATIONS

Popovic et al.; Interactive Manipulation of Rigid Body Simulations; 2000; ACM, SIGGRAPH '00.*

(Continued)

*Primary Examiner* — David T Welch
(74) *Attorney, Agent, or Firm* — Fitch, Even, Tabin & Flannery, LLP

(57) ABSTRACT

A method for use in computer graphics includes receiving data representative of a plurality of particles. For each particle, the method further includes calculating a time at which a collision will occur based on a current trajectory of the particle. For pairs of particles that will collide with each other, another operation includes changing a direction of the particles to avoid a collision, wherein the changed directions approximate directions that would result from the collision. For particles in static contact, another operation includes allowing particles to push each other without bouncing. For particles in static contact that were previously moved by being pushed, the method also does not allow the particles to move during future collisions occurring during a time step.

15 Claims, 6 Drawing Sheets

U.S. PATENT DOCUMENTS

| | | | |
|---|---|---|---|
| 2007/0035547 A1* | 2/2007 | Anderson et al. | 345/473 |
| 2007/0083290 A1* | 4/2007 | Nagasaka | 700/245 |
| 2007/0239409 A1* | 10/2007 | Alan | 703/2 |
| 2008/0192046 A1 | 8/2008 | Fowler et al. | |
| 2008/0192047 A1 | 8/2008 | Radzikowski et al. | |
| 2008/0232602 A1 | 9/2008 | Shearer | |
| 2008/0243452 A1* | 10/2008 | Bowers et al. | 703/2 |
| 2009/0251469 A1 | 10/2009 | Cohen | |
| 2009/0306946 A1* | 12/2009 | Badler et al. | 703/2 |

OTHER PUBLICATIONS

Pelechano; Real-Time Collision Detection Between Cloth and Skinned Avatars Using OBB; Sep. 9, 2002; University College London.*

Egan; Techniques for Real-Time Rigid Body Simulation; May 2003; Brown University.*

Redon et al.; Adaptive Dynamics of Articulated Bodies; Jul. 2005; ACM, SIGGRAPH '05; vol. 24, Issue 3.*

Lee et al.; Impulse-Based Dynamic Simulation of Articulated Rigid Bodies with Aerodynamics; Oct. 2006; 2006 IEEE International Conference on Systems, Man, and Cybernetics.*

U.S. Appl. No. 61/042,411, filed Apr. 4, 2008; Inventors Cohen et al.; entitled "Method for Simulating Large Numbers of Spherical Bodies Interacting"; all pages.

U.S. Appl. No. 61/042,404, filed Apr. 4, 2008; Inventor Jonathan Cohen; entitled "Method for Detecting Collisions Among Large Number of Particles"; all pages.

U.S. Appl. No. 60/926,594, filed Apr. 27, 2007; Inventors Cohen et al; entitled "Continuous-Time Particle Simulation of Sand"; all pages.

U.S. Appl. No. 60/926,506, filed Apr. 27, 2007; Inventors Bloom et al; entitled "FX for the Birth of Sandman Sequence"; all pages.

U.S. Appl. No. 60/926,501, filed Apr. 27, 2007; Inventor Jonathan Cohen; entitled "Dynamic Execution Tracing of Physical Simulations"; all pages.

U.S. Appl. No. 60/926,494, filed Apr. 27, 2007; Inventors Pilgrim et al; entitled "How to Build a Sixty Foot Man of Moving Sand"; all pages.

U.S. Appl. No. 60/926,497, filed Apr. 27, 2007; Inventors Laney et al; entitled "Geometry Bombing. A Technique Place Procedural Geometry Instances Using Proxy"; all pages.

U.S. Appl. No. 12/111,075, filed Apr. 28, 2008; Inventor Jonathan Cohen; entitled "Method for Detecting Collisions Among Large Number of Particles"; all pages.

Bell, N. et al.; "Particle-Based Simulation of Granular Materials"; Eurographics/ACM SIGGRAPH Symposium on Computer Animation; The Eurographics Association; 2005; 10 pages.

Moore, M. et al.; "Collision Detection and Response for Computer Animation"; Computer Graphics, SIGGRAPH, vol. 22, No. 4; Aug. 1988; pp. 289-298.

Guendelman, E. et al.; "Nonconvex Rigid Bodies with Stacking"; ACM Transactions on Graphics, SIGGRAPH; vol. 22, No. 3; Jul. 2003; 8 pages.

USPTO; Office Action issued in U.S. Appl. No. 12/111,075; mailed Mar. 3, 2011; 8 pages.

USPTO; Notice of Allowance issued in U.S. Appl. No. 12/111,075; mailed Aug. 4, 2011; 7 pages.

USPTO; Notice of Allowance issued in U.S. Appl. No. 12/111,075; mailed Dec. 1, 2011; 7 pages.

USPTO; Notice of Allowance issued in U.S. Appl. No. 12/111,075; mailed Jun. 7, 2012, 7 pages.

* cited by examiner

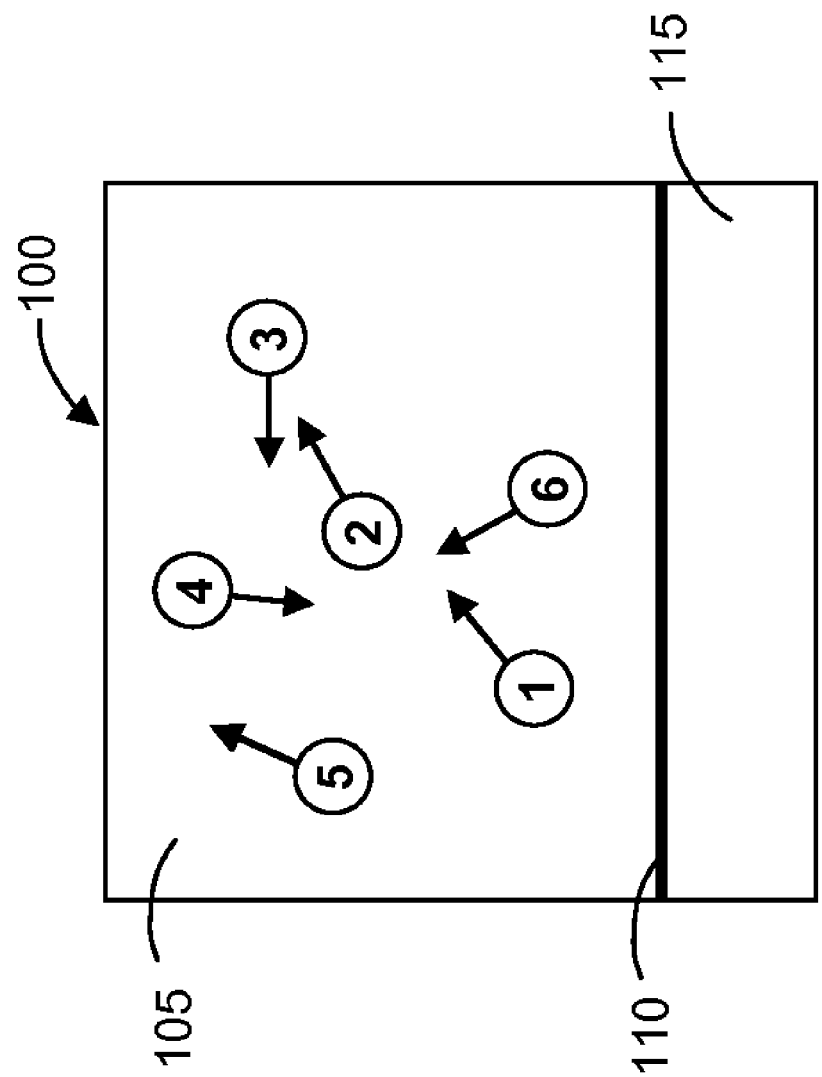

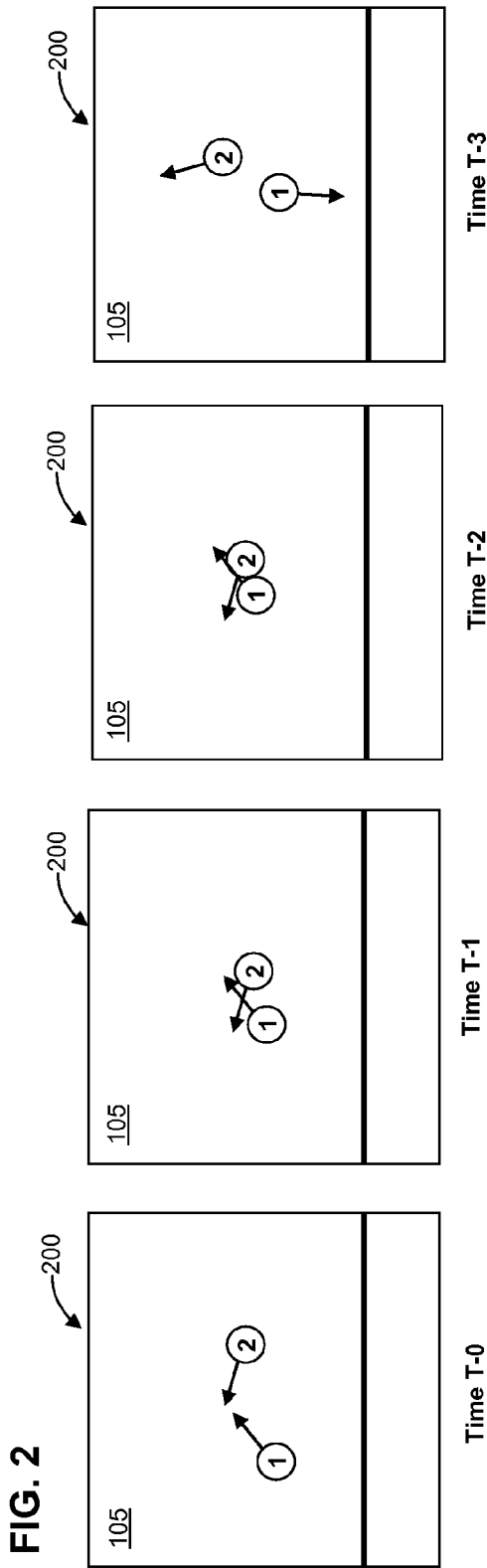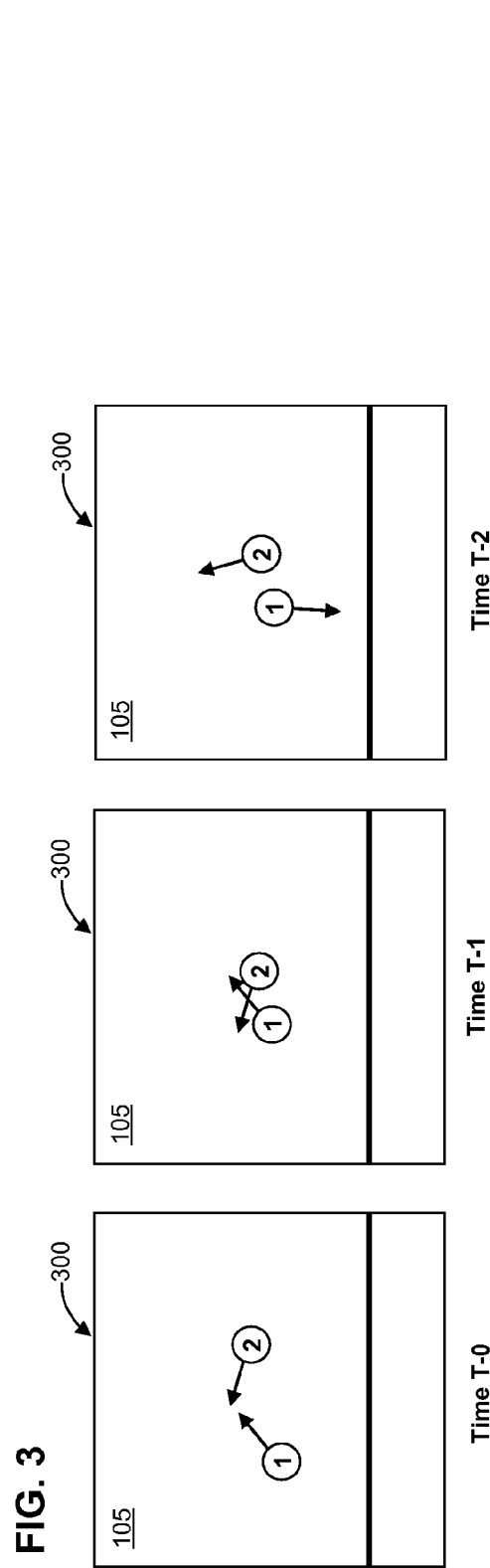

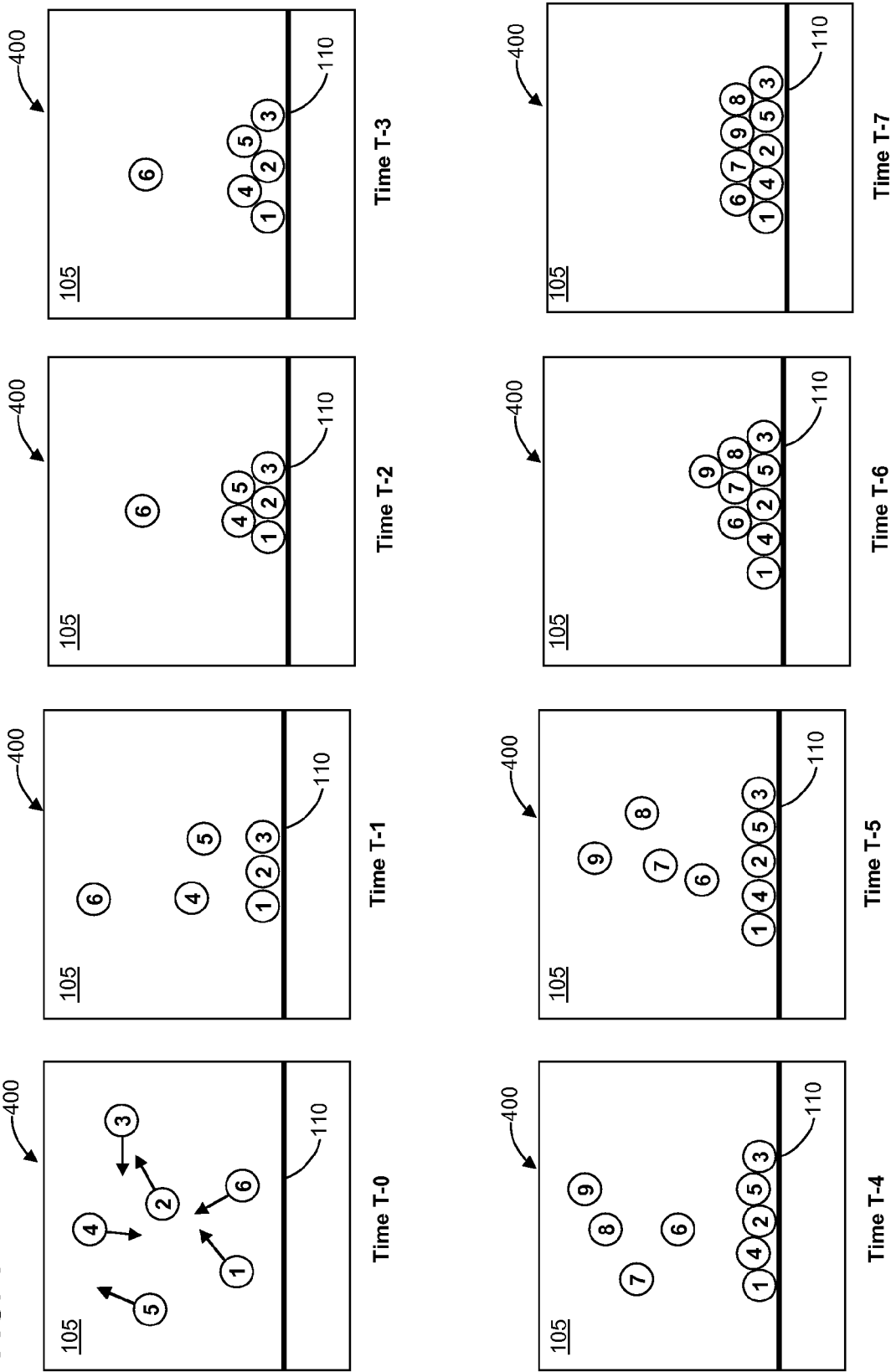

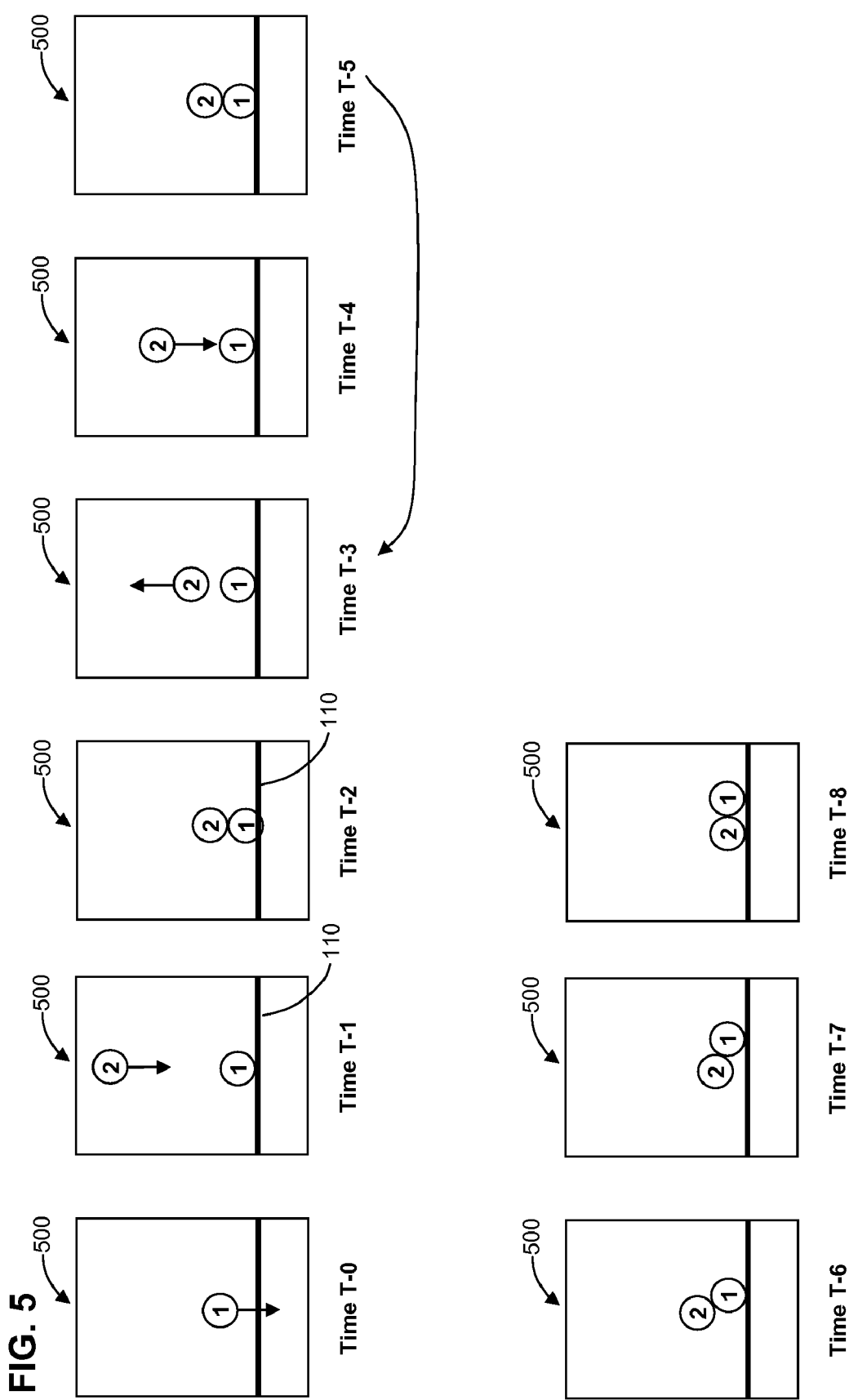

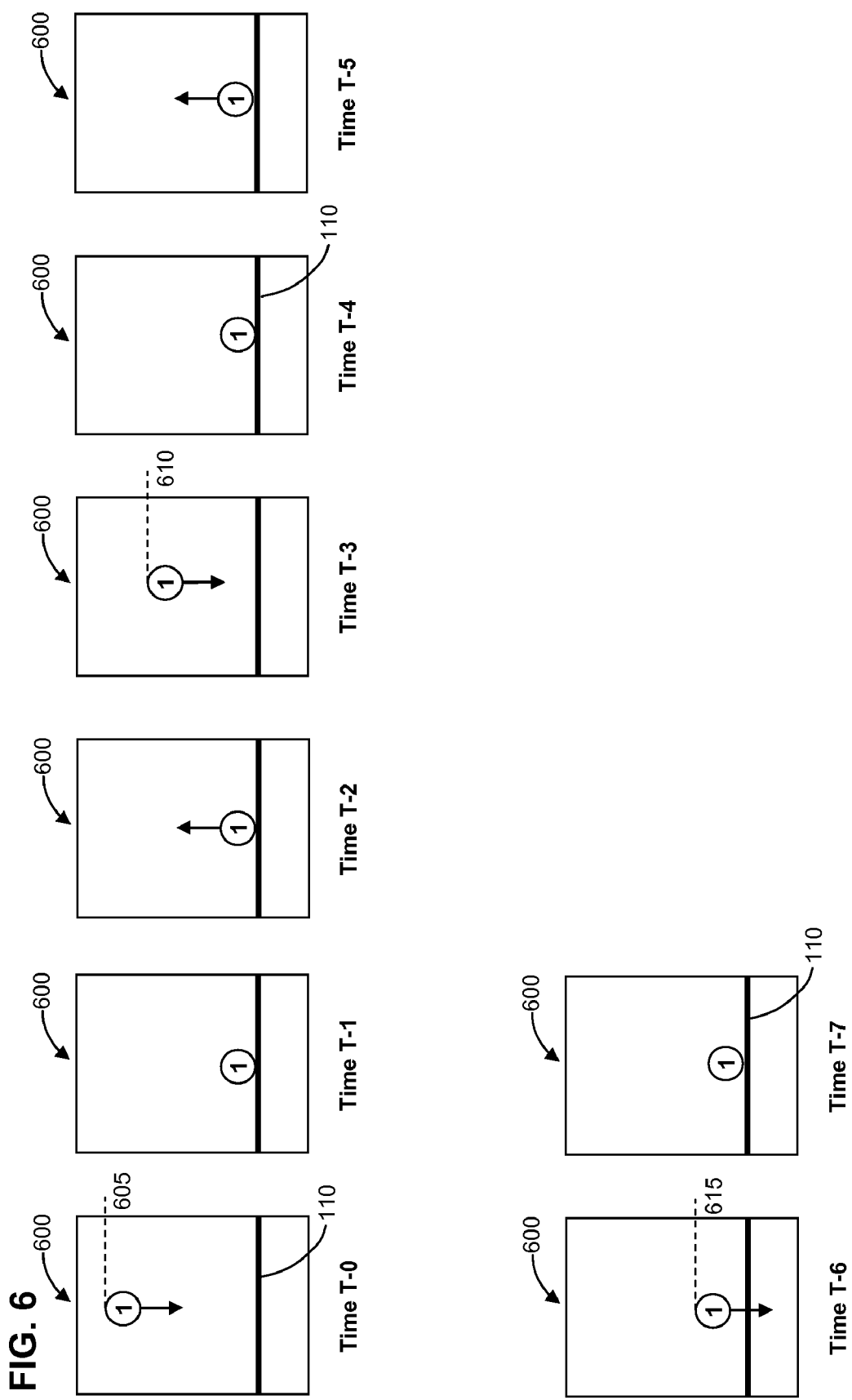

METHOD FOR SIMULATING LARGE NUMBERS OF SPHERICAL BODIES INTERACTING

CROSS-REFERENCE TO RELATED APPLICATIONS

This application claims the benefit of: U.S. Provisional Patent Application No. 60/926,594, filed Apr. 27, 2007; U.S. Provisional Patent Application No. 60/926,506, filed Apr. 27, 2007; U.S. Provisional Patent Application No. 60/926,501, filed Apr. 27, 2007; U.S. Provisional Patent Application No. 61/042,411, filed Apr. 4, 2008; and U.S. Provisional Patent Application No. 61/042,404, filed Apr. 4, 2008; all of which are incorporated in their entirety herein by reference.

The following applications are hereby fully incorporated herein by reference in their entireties: U.S. Provisional Patent Application No. 60/926,494, filed Apr. 27, 2007; U.S. Provisional Patent Application No. 60/926,497, filed Apr. 27, 2007; and U.S. patent application Ser. No. 12/111,075, filed on the same date as this application, entitled "METHOD FOR DETECTING COLLISIONS AMONG LARGE NUMBERS OF PARTICLES."

BACKGROUND OF THE INVENTION

1. Field of the Invention

The present invention relates generally to computer graphics and animation, and more specifically to simulating large numbers of bodies interacting.

2. Discussion of the Related Art

Computer animation is increasingly being used in movies, motion pictures, television, video games, etc. It is often necessary in such animations to simulate the dynamics of large numbers of bodies interacting, such as rocks, sand, etc.

SUMMARY OF THE INVENTION

One embodiment provides a method for use in computer graphics and includes receiving data representative of a plurality of particles. For each particle, the method further includes calculating a time at which a collision will occur based on a current trajectory of the particle. For pairs of particles that will collide with each other, another operation includes changing a direction of the particles to avoid a collision, wherein the changed directions approximate directions that would result from the collision. For particles in static contact, another operation includes allowing particles to push each other without bouncing. For particles in static contact that were previously moved by being pushed, the method also does not allow the particles to move during future collisions occurring during a time step.

Another embodiment provides a method for use in computer graphics and includes receiving data representative of a plurality of particles. For each particle, the method includes calculating one or more collision times based on a current trajectory of the particle. For pairs of particles that will collide, the method also includes applying a collision impulse to each particle if the collision is an earliest collision for each particle. For particles in static contact, another operation includes sorting the particles using a topological sort and then applying inelastic collision impulses. For particles in static contact that had inelastic collision impulses applied, the method includes treating the particles as having infinite mass during future collisions occurring during a time step.

Yet another embodiment includes a computer-readable medium for use in computer graphics, the computer-readable medium comprising instructions which, when executed by a processor, cause the processor to perform receiving data representative of a plurality of particles. Further instructions include, for each particle, calculating a time at which a collision will occur based on a current trajectory of the particle, and for pairs of particles that will collide with each other, changing a direction of the particles to avoid a collision, wherein the changed directions approximate directions that would result from the collision.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings.

FIG. 1 depicts a simulation for spherical bodies or other objects moving within an environment.

FIG. 2 depicts a simulation during which two objects collide over a period of time.

FIG. 3 depicts a simulation of two objects over a period of time, in accordance with an embodiment of the present invention.

FIG. 4 depicts a simulation which addresses a static contact phase in accordance with an embodiment of the present invention.

FIG. 5 depicts a simulation which addresses contact with a resting object in accordance with an embodiment of the present invention.

FIG. 6 depicts an example of removing kinetic energy from a simulation in accordance with an embodiment of the present invention.

DETAILED DESCRIPTION

Figure 7:
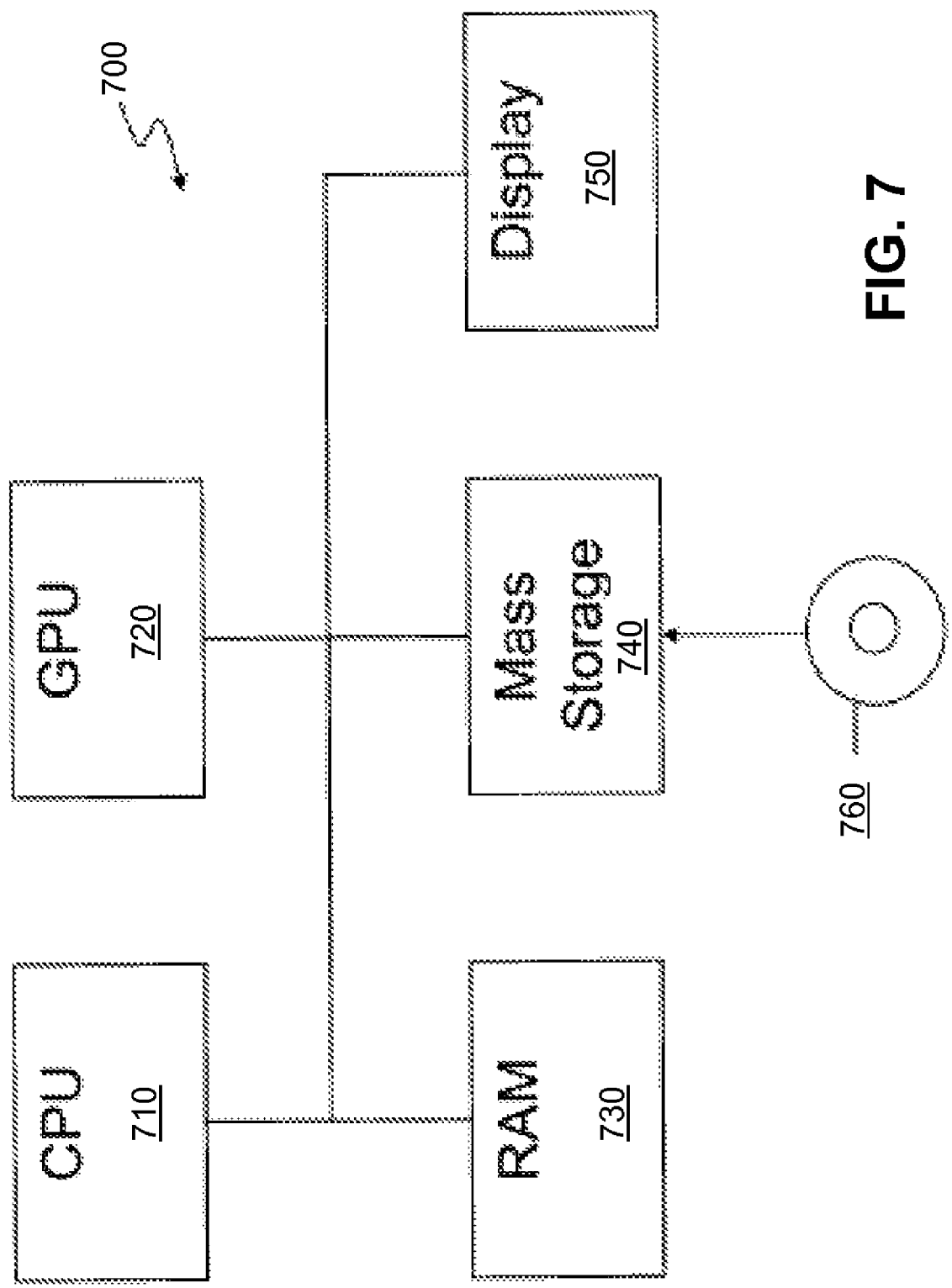
FIG. 7 is a block diagram depicting a system that may be used to implement various methods disclosed herein.

Previous systems have simulated the dynamics of large numbers of bodies interacting, called rigid body dynamics, by using discrete time stepping. In discrete time stepping, objects are moved forward in time a small amount. Then the system checks for collisions, resets the time, and handles the collisions by moving the objects slightly. Discrete algorithms use information about whether a collision has happened within a time step, but they do not have information about precisely when the collision first occurred.

Discrete time stepping, however, does not work well for simulating a large number of objects or bodies, such as many thousands of objects or bodies. Namely, with a large number of objects, collisions between the objects are constantly occurring. If the time steps are not small enough, the objects will fly off in random directions. So the time steps must be made very small. But with small time steps for thousands of objects, the system becomes very slow and the simulation takes an excessive period of time.

Some of the embodiments of the present invention provide a method for simulating large numbers of bodies interacting. It is believed better than the so-called discrete element method commonly used in the mining industry since it is orders of magnitude faster.

In addition, such methods may be used for approximately simulating the dynamics of granular materials, such as piles of sand, rocks, powders, etc. The method deals with how the bodies react given that a collision has been detected.

In some embodiments, the bodies that interact are assumed to be spheres. While the actual bodies may eventually be rendered, the bodies are assumed to be spheres for purposes of the analysis. That is, it is assumed that everything interacts with each other as if they were spheres. The analysis is simplified by assuming that all the objects are spheres. Thus, in some embodiments large numbers of spheres are simulated, such as for example a giant pile of billiard balls (e.g. >100 k objects). But when the bodies are rendered, they may be rendered as real objects.

In general, a method in accordance with one embodiment involves analytically solving for when objects will collide at some point in the future without actually having to advance the system. That is, given two spheres and their velocities, a calculation is made to determine the time that they will first collide. This information is then used to adjust the objects to prevent collisions in the future. In many situations, this is significantly more efficient than previous methods. Thus, continuous-time collision data is used to prevent future collisions. In some embodiments, rather than taking a large number of small discrete time steps, a smaller number of larger time steps are taken because of a new continuous-time method of detecting and handling collisions between spheres, which is described herein.

Thus, a method for simulating large numbers of spherical bodies interacting according to one embodiment involves first calculating all collision times based on the current trajectories of the particles. Namely, for a given set of particles that are going to collide, the time at which each of them will collide with another particle is calculated. This provides a list of collision times for each particle.

Next, the list of collision times for each particle is used to adjust the particles. This involves the calculation of collision impulses. A collision impulse is a change to a particles' velocity and/or direction. In some embodiments, the calculation of the collision impulses can be broken down into three phases.

In the first phase, or "collision phase," the first or next collision for each particle is identified. Then the reflection angle and/or angle of bounce is calculated. A collision impulse is then applied to change to the particles' velocity and/or direction to match or approximate the reflection or bounce. The collision impulse is applied without allowing the collision to actually occur.

For all of the collision pairs, the collision impulse is applied if the collision is the earliest collision for each particle. After applying the collision impulse, the collision data structure may be updated but it is not necessary to rebuild a list of collisions. The collision impulse is repeated n times, wherein n varies according to application and desired affect. In a typical embodiment, n ranges from 1-5, but greater numbers may be used.

A second phase addresses static contacts and includes finding all remaining particles that are in static contact (i.e., with collisions at a current time). Such particles may be sorted using a topological sort, for example. Inelastic collision impulses may also be applied to such particles. This phase may also be repeated n times (e.g., n ranging from 1-5, or greater).

A third phase, which is similar to the just-discussed static contact phase, addresses previously visited particles. In particular, previously visited particles are treated as having an infinite mass during collision.

Additional operations include removing kinetic energy from the system by applying an impulse to shrink the magnitude of a velocity vector after each collision to correct error in potential energy due to this integration scheme.

Turning now to the figures, FIG. 1 depicts a simulation for spherical bodies or other objects moving within an environment. In particular, simulation 100 includes a number of objects (e.g., spherical bodies, particles, etc.), which are denoted by reference numbers 1-6. The objects are shown moving within environment 105, which is bounded by surface 110 of ground 115.

Each object 1-6 includes an arrow which denotes an associated parameter (e.g., velocity, direction, trajectory, combinations thereof). For clarity, further description will relate primarily to the arrow of the object as defining a trajectory or direction, but such teachings apply equally to other parameters. In addition, only a few objects are shown, but the various simulation techniques presented herein apply also to scenarios in which greater numbers (e.g., ranging from dozens to several hundred thousands, or more) of objects are present.

Typically, environment 105 includes a gravitational parameter which is a force applied to objects 1-6. In some embodiments, gravity will ultimately cause the objects to fall toward surface 110. In addition, since each of the objects is moving about in various directions, collisions among these objects is inevitable, absent an intervening operation.

FIG. 2 depicts a simulation during which two objects collide over a period of time. At time T-0 of simulation 200, objects 1 and 2 are shown moving within environment 105. Each object includes a particular trajectory, represented by its respective arrow, along which it is moving within the environment. For clarity, only two objects are shown in this example. At time T-0, object 1 is moving in a generally rightward direction and object 2 is moving in a generally leftward direction.

At time T-1, each object has progressed along its respective path such that the objects are nearing a collision. Time T-2 represents a collision between objects 1 and 2. As a result of this collision, object 1 is directed generally downward while object 2 is directed generally upward.

FIG. 3 depicts a simulation for two objects over a period of time, in accordance with an embodiment of the present invention. FIG. 3 is one example of a simulation occurring during a collision phase. In this embodiment, during times T-0 and T-1 of simulation 300, objects 1 and 2 move within environment 105 in a manner similar to times T-0 and T-1 of FIG. 2. However, at time T-1 of the example of FIG. 3, object 2 is identified as a collision object for object 1, for example. A collision object is a particular object (e.g., object 2) of all of the objects within environment 105 that object 1 will first collide with in a given period of time.

For example, a calculation may be performed which identifies that object 1 will first collide with object 2 within the time period defined by time T-1 and time T-2 of FIG. 2. This identification is typically performed for all of the objects within environment 105, or for a certain subset of objects within the environment, and results in a collision pair list. One technique for calculating the collision pair list is to use information such as the trajectory or velocity of the objects.

Once the collision object has been identified (e.g., object 2), another operation includes determining the trajectory of object 1 if the collision with object 2 would have occurred. This trajectory calculation will also be referred to as a reflection angle or angle of bounce. An example of the calculated trajectory of object 1 is shown in time T-3 of FIG. 2, which again depicts the trajectory of objects 1 and 2 after a collision has occurred. A feature of FIG. 3 therefore determines a post-collision trajectory of an object without actually permitting the collision to occur (as is the case in FIG. 2).

At time T-2 of FIG. 3, another operation includes changing an existing trajectory (i.e., the trajectory at time T-1) of object 1 to the calculated trajectory, which is the trajectory that object 1 would have had if the collision with object 2 would have occurred. Notably, the trajectory of object 1 at time T-3 of FIG. 2 (post-collision) is the same or similar to the trajectory of object 1 at time T-2 of FIG. 3 (collision simulated). This is one technique for applying a collision impulse to object 1 to change its velocity and/or direction, for example, to match or approximate the reflection angle or bounce angle. The trajectory of other objects located within the environment, such as object 2, may be changed in a similar manner.

In an embodiment which includes multiple pairs of objects that will collide during a given time period, the changing of the direction or trajectory, for example, of the various objects may be performed in a relative order based upon the time at which the collision will occur. For example, the directions of the objects that will collide first will be changed first, and the directions of the remaining objects will be successively changed based upon their relative time of collision.

In FIG. 3, since the trajectory is changed prior to collision, the relative location of the affected objects (e.g., objects 1 and 2) is different as compared to the post-collision position of these objects (time T-3 of FIG. 3). This is because the FIG. 2 example actually permits the collision to occur, whereas the FIG. 3 example applies a collision impulse to change trajectories prior to the actual collision. Unsatisfactory simulation results may occur if existing trajectories are changed to soon (e.g., the distance between objects 1 and 2 at time t-1 of FIG. 3 is too great). Accordingly, it is often desirable to permit objects 1 and 2 to move until they nearly collide in order to maximize the perceived validity of the simulation collision. This may be done by decreasing the length of the time step.

To eliminate a threshold level number of collisions, the forgoing operations associated with time T-1 and time T-2 may be repeated a number of times (e.g., 2-5, or more) as required or desired. Consequently, the operations associated with FIG. 3 define one technique for applying a collision impulse to objects moving about environment 105, such as objects 1 and 2.

FIG. 4 depicts a simulation which addresses a static contact phase in accordance with an embodiment of the present invention. In particular, at time T-0, simulation 400 includes a number of objects 1-6 moving within environment 105, which again is bounded by surface 110.

At time T-1, the simulation has progressed to the point at which three objects 1-3 are resting on surface 110. Three additional objects 4-6 as shown moving about environment 105. For clarity, the trajectory arrows of the objects have been omitted from the remaining time periods of this figure. Surface 110 represents any material which can support, at least temporarily, an at-rest object such as a floor, the ground, table top, etc. The surface may represent both natural and manmade materials, specific examples of which include dirt, concrete, asphalt, wood, rock, plastic, metal, and the like.

Time T-2 depicts objects 4 and 5 in contact with objects 1-3. In one particular scenario, objects 4 and 5 are in static contact with objects 1-3. This scenario may be identified by determining that objects 4 and 5 are a second subset of the objects of the simulation. This second subset of objects may be defined by objects which are currently in contact (e.g., collision at a current time) with at least one other object present in environment 105.

The second subset may be further defined as a multiple level hierarchal arrangement extending from the surface (e.g., ground) upward such that a lower level of objects are individually in contact with at least one object of an adjacent upper level. In the example of time T-2 of FIG. 4, objects 1-3 are currently on the lower level and objects 4 and 5 are currently on the upper level.

In an embodiment, this scenario is handled by laterally moving lower level objects to permit contacting adjacent upper level objects to move into the adjacent lower level. This operation is typically accomplished beginning at a lowest level and progressing upward through each level of the hierarchal arrangement. A topological sort is useful for performing this operation.

In the example of FIG. 4, at time T-3, objects 1 and 3 are each moved laterally along surface 110, which results in voids that permit objects 4 and 5 to fall toward the surface.

At time T-4, movement of objects 1 and 3 progresses, which further permits objects 4 and 5 to fall closer to surface 110. Note also that additional objects 6-9 have come into view of the simulation.

At time T-5, objects 1 and 3 have moved a sufficient distance to permit objects 4 and 5 to fall onto surface 110. In an embodiment, some or all of the objects that were involved in the sliding operation of time T-4 may be assigned an attribute or parameter (e.g., an inelastic collision impulse) which indicates that such objects (e.g., objects 1-5) are no longer permitted to move when contacted by other objects, when such contact occurs during a given time period or time step. This is an example of the third phase which addresses previously visited objects. As a specific example, such objects may be identified as having infinite mass during a collision or other contact. Accordingly, for a given time step, once an object has undergone a sliding operation, such as that depicted in times T-2 through T-5, such object will not be permitted to further slide or otherwise be permitted to move to allow an adjacent and contacting object to pass. An example of this feature will now be described in more detail with regard to times T-6 and T-7.

At time T-6, objects 6-8 are shown in static contact with the underlying row of objects 2-5. Objects 2-5 include an inelastic impulse, for example, which does not permit such objects to move any further during the given time step. Consequently, objects 2-5 do not move laterally to permit objects 6-8 to fall to surface 110. However, since objects 6-8 were not involved in a previous static contact scenario (e.g., times T-1 through T-5), they are permitted to move laterally. In particular, objects 6 and 7 move laterally to the left which permits object 9 to fall downward and ultimately contact the underlying row of objects (i.e., objects 1-5). The process by which objects 6 and 7 slide to permit object 9 to fall is similar to the process by which objects 4 and 5 were permitted to fall in time T-5.

In addition, since objects 6-9 were involved in a sliding operation, such objects may also be assigned an attribute or parameter which indicates that they are no longer permitted to move, laterally or otherwise, when contacted by other objects during a given time step. Thus, objects 6-9 may be assigned parameters, after the sliding operation, in a manner similar to that of objects 1-5. The foregoing operations may be repeated for each layer of objects occurring in the simulation.

FIG. 5 depicts a simulation which addresses contact with a resting object in accordance with an embodiment of the present invention. In this figure, simulation 500 includes object 1 moving toward surface 110. Ultimately, object 1 comes to rest on surface 110, such as that depicted in time T-1. At this point, object 2 is shown entering the simulation and moves toward object 1. At time T-2, object 2 has contacted object 1, forcing object 1 below surface 110.

At time T-3, the objects rebound to the extent that object 2 moves upward and object 1 reestablishes its position on surface 110. Object 2 passes through its peak and then falls downward toward object 1 (time T-4). At time T-5, object 2 again collides with object 1. The actions of times T-3 through T-5 will typically occur a number of times.

At some point, object 2 will reach a state of static contact with object 1. At this point, objects 1 and 2 will undergo a sliding operation similar to that described in FIG. 4. For example, at time T-6 of FIG. 5, object 1 slides laterally on surface 110 to permit object 2 to fall. Time T-7 shows object 2 continuing to fall unit it comes to rest on surface 110 at time T-8.

In an embodiment, since objects 1 and 2 were involved in a sliding operation, such objects may also be assigned an attribute or parameter which indicates that they are no longer permitted to move (e.g., laterally) when contacted by other objects.

FIG. 6 depicts an example of removing kinetic energy from a simulation in accordance with an embodiment of the present invention. In simulation 600 at time T-0, object 1 is shown located at height 605 and moves toward surface 110. Object 1 contacts the surface at time T-1, and then rebounds (also referred to a bounce) in the opposite direction upwards from surface 110 (time T-2). In an embodiment, the velocity of object 1 is reduced resulting in a modification of kinetic energy of the object. As a result of the reduction of velocity, object 1 crests at height 610, which is lower than height 605 at time T-0.

Object 1 then falls to surface 110 at time T-4, and again rebounds upward at time T-5. At time T-6, velocity of object 1 is further reduced, resulting in the object cresting at height 615, which is lower than height 610. After sufficient amounts of velocity have been removed, object 1 ultimately comes to rest at surface 110. It is understood that the reducing of velocity of an object may be repeated greater or fewer times than depicted in FIG. 6.

The foregoing describes three phases, referred to as the collision phase, static phase, and the previously visited phase. An additional phase or feature includes removing kinetic energy from the simulation. In accordance with various embodiments, each of these phases may be implemented separately, or some or all of these phases may be implemented together, in any order.

Such embodiments may be implemented to enhance visual effects, such as for simulating granular material in motion pictures. Other application relate to the engineering community for simulating granular materials, for example.

A further embodiment will now be described which implements particle simulations using a grain model. In this embodiment, a grain model is typically spherical in geometry and includes three material properties, coefficient of friction μ, coefficient of restitution ε, and mass m. A particle's state may be described by its position and velocity, with no rotational state or dynamics considered. Static and dynamic friction may be obtained by using a cone of friction model, for example, which alleviates the need for complex grain geometries. In the absence of collisions, a particle may be integrated according to the forward Euler rule:

$$\begin{pmatrix} x_t + \Delta_t \\ \dot{x}_t + \Delta_t \end{pmatrix} = \begin{pmatrix} x_t \\ \dot{x}_t \end{pmatrix} + \Delta t \begin{pmatrix} \dot{x}_t \\ F_t/m \end{pmatrix}. \quad \text{Equ. (1)}$$

Collisions generally generate impulses which are applied by directly modifying the velocity $\dot{x}$ of a particle immediately before the integration step. During a collision, collision response impulses may be generated using various types of rules, including those described herein.

Consider the example in which two particles currently centered at positions $x_1$ and $x_2$, and traveling at velocities $v_1$ and $v_2$, collide t seconds in the future. The relative velocity (from the point of view of particle 1) at the point of collision may be $u_{rel}=v_1-v_2$ and the normal vector is $N=x_1+tv_1-(x_2+tv_2)$ normalized to unit length. Another operation includes decomposing $u_{rel}$ into normal and tangential components, $u_{rel,n}=u_{rel}\cdot N$ and $u_{rel,t}=u_{rel}-u_{rel,n}N$. Collision impulses j may then be calculated, which are then applied to the two particles so that the velocities after the impulses can be presented by $v_1'=v_1-jm_1^{-1}/(m_1^{-1}+m_2^{-1})$ and $v_2'=v_1+jm_2^{-1}/(m_1^{-1}+m_2^{-1})$.

Impulse j may be computed as follows. For the purposes of a collision pair, μ is considered to be the larger of the values of the two particles, and ε is the smaller of the values. One test is to determine if $u_{rel,n}$ is less than 0. If this is not the case, the two particles are moving away from each other at the time of collision and no impulse is applied. Otherwise, the following calculation is performed $j=-\epsilon u_{rel,n}\cdot N-u_{rel}$. The normal part of j may be calculated as $j_n=j\cdot N$. If j is outside the cone of friction, $|j-j_n N|>\mu j_n$, a kinetic friction impulse may be calculated by setting $j_n'=-(1+\epsilon)u_{rel,n}$ and $j_t'=\mu j_n'u_{rel,t}/|u_{rel,t}|$ and resetting $j=j_n'N-j_t'$.

As an example, stacked piles of grains may be handled by building a contact graph of all particle-particle collisions, and applying impulses in order from the bottom to the top of a pile. Taken together, these rules provide sufficient complexity for piling and sliding behavior to arise, even with spherical geometry and no rotational dynamics.

The methods and techniques described herein may be utilized, implemented and/or run on many different types of systems. Referring to FIG. 7, there is illustrated a system 700 that may be used for any such implementations. One or more components of system 700 may be used for implementing any system or device that, for example, performs the various phases described above (e.g., collision phase, static phase, previously visited phase, remove kinetic energy, and the like). However, the use of the system 700 or any portion thereof is certainly not required.

By way of example, system 700 may include, but is not required to include, a central processing unit (CPU) 710, a graphics processing unit (GPU) 720, a random access memory (RAM) 730, and a mass storage unit 740, such as a disk drive, and a display 750. The system 700 comprises an example of a processor based system.

The CPU 710 and/or GPU 720 may be used to execute or assist in executing the steps of the methods and techniques described herein, and various simulations may be rendered on display 750. Removable storage media 760 may optionally be used with the mass storage unit 740, which may be used for storing code that implements the methods and techniques described herein, such as code for performing the simulations as described above. However, any of the storage devices, such as the RAM 730 or mass storage unit 740, may be used for storing such code. For example, any of such storage devices may serve as a tangible computer storage medium for embodying a computer program for causing a computer, system, console, or other processor based system to execute or perform the steps of any of the methods, code, and/or techniques described herein. Furthermore, any of the storage devices, such as the RAM 730 or mass storage unit 740, may be used for storing any needed database(s).

In some embodiments, one or more of the methods and/or techniques described above may be implemented in a computer program executable by a processor based system. By way of example, a processor based system may comprise any type of system having one or more processors, such as the above-described system 700 or similar system, a computer, DVD player, Blu-ray disc player, entertainment system, game console, etc. Such computer program may be used for executing various steps and/or features of the above-described methods and/or techniques. In some embodiments, software modules within the computer program may be used for executing various steps and/or features of the above-described methods and/or techniques.

Such computer programs may be stored or embodied in any type of computer readable storage or recording medium. By way of example, such computer readable storage medium may include, but is not limited to, any type of computer memory or storage, such as main memory, local memory, ROM, RAM, mass storage, hard disk drive, network storage, USB storage, Blu-ray disc, digital video disk (DVD), compact disk (CD), floppy disk, etc.

The above description is not to be taken in a limiting sense, but is made merely for the purpose of describing the general principles of exemplary embodiments. The scope of the invention should be determined with reference to the claims.

What is claimed is:

1. A method for use in computer graphics, comprising:
receiving data representative of a plurality of particles;
for pairs of particles that will collide with each other, calculating a time at which the collision will occur based on a current trajectory of the particle pair; and
for pairs of particles that will collide with each other, calculating the collision impulse to each particle resulting from the collision with the other particle by calculating the angle of reflection and change in velocity for each particle resulting from the collision; and
for pairs of particles that will collide with each other, applying this collision impulse to each particle prior to the collision to adjust each particle's direction and velocity such that the relative positions of the two particles of each pair are different than they would be if they had collided;
for particles in static contact, moving at least one particle to allow movement of a second particle to a static position, sorting the particles using a topological sort, and applying inelastic collision impulses to at least some of the particles; and
for particles in static contact that had inelastic collision impulses applied, treating the particles as having infinite mass during future collisions occurring during a time step by assigning a parameter to the particles indicating that the particles are not permitted to move when contacted by other particles.

2. The method of claim 1, further comprising:
for particles in static contact, allowing particles to push each other without bouncing; and
for particles in static contact that were previously moved by being pushed, not allowing the particles to move during future collisions occurring during a time step.

3. The method of claim 1, wherein the adjusting of the direction of the particles is performed in a relative order based upon the time at which the collision will occur.

4. The method of claim 1, wherein the adjusting of the direction of the particles is performed in a relative order beginning from a collision which will occur first in time and proceeding to a collision which will occur last in time.

5. The method of claim 1, further comprising:
applying a second impulse to at least one particle after a collision impulse to shrink a magnitude of a velocity vector associated with the at least one particle.

6. The method of claim 1 wherein the parameter is infinite mass.

7. The method of claim 1 further comprising:
reducing the velocity of a particle following application of a collision impulse to simulate the transfer of kinetic energy to some other form following the simulated collision.

8. A method for use in computer graphics, comprising:
receiving data representative of a plurality of particles;
for pairs of particles that will collide with each other, calculating a time at which the collision will occur based on a current trajectory of the particle pair;
for pairs of particles that will collide, calculating a collision impulse to each particle by calculating the angle of reflection and change in velocity for each particle resulting from the collision if the collision is an earliest collision for each particle; and
for pairs of particles that will collide with each other, applying this collision impulse to each particle prior to the collision to adjust each particle's direction and velocity such that the relative positions of the two particles of each pair are different than they would be if they had collided;
for particles in static contact, moving at least one particle to allow movement of a second particle to a static position, sorting the particles using a topological sort, and applying inelastic collision impulses to at least some of the particles; and
for particles in static contact that had inelastic collision impulses applied, treating the particles as having infinite mass during future collisions occurring during a time step by assigning a parameter to the particles indicating that the particles are not permitted to move when contacted by other particles.

9. The method of claim 8, further comprising:
for particles in static contact, allowing particles to push each other without bouncing; and
for particles in static contact that were previously moved by being pushed, not allowing the particles to move during future collisions occurring during a time step.

10. The method of claim 8, further comprising:
applying a second impulse to at least one particle after a collision impulse to shrink a magnitude of a velocity vector associated with the at least one particle.

11. A non-transitory computer-readable medium for use in computer graphics, the computer-readable medium comprising instructions which, when executed by a processor, cause the processor to perform:
receiving data representative of a plurality of particles;
for pairs of particles that will collide with each other, calculating a time at which the collision will occur based on a current trajectory of the particle pair; and
for pairs of particles that will collide with each other, calculating the collision impulse to each particle resulting from the collision with the other particle by calculating the angle of reflection and change in velocity for each particle resulting from the collision; and
for pairs of particles that will collide with each other, applying this collision impulse to each particle prior to the collision to adjust each particle's direction and velocity such that the relative positions of the two particles of each pair are different than they would be if they had collided;

for particles in static contact, moving at least one particle to allow movement of a second particle to a static position, sorting the particles using a topological sort, and applying inelastic collision impulses to at least some of the particles; and for particles in static contact that had inelastic collision impulses applied, treating the particles as having infinite mass during future collisions occurring during a time step by assigning a parameter to the particles indicating that the particles are not permitted to move when contacted by other particles.

12. The non-transitory computer-readable medium of claim 11, wherein the computer-readable medium further comprises instructions which, when executed by the processor, cause the processor to further perform:

for particles in static contact, allowing particles to push each other without bouncing; and for particles in static contact that were previously moved by being pushed, not allowing the particles to move during future collisions occurring during a time step.

13. The non-transitory computer-readable medium of claim 11, wherein the computer-readable medium further comprises instructions which, when executed by the processor, cause the processor to further perform:

providing the changing of the direction of the particles in a relative order based upon the time at which the collision will occur.

14. The non-transitory computer-readable medium of claim 11, wherein the computer-readable medium further comprises instructions which, when executed by the processor, cause the processor to further perform:

providing the changing of the direction of the particles in a relative order beginning from a collision which will occur first in time and proceeding to a collision which will occur last in time.

15. The non-transitory computer-readable medium of claim 11, wherein the computer-readable medium further comprises instructions which, when executed by the processor, cause the processor to further perform:

applying a second impulse to at least one particle after a collision impulse to shrink a magnitude of a velocity vector associated with the at least one particle.

* * * * *